United States Patent [19]

Wedellsborg

[11] Patent Number: 5,544,210
[45] Date of Patent: Aug. 6, 1996

[54] PRESSURE VESSEL APPARATUS FOR CONTAINING FLUID UNDER HIGH TEMPERATURE AND PRESSURE

[76] Inventor: Bendt W. Wedellsborg, 552 Maureen La., Pleasant Hill, Calif. 94523

[21] Appl. No.: 500,604

[22] Filed: Jul. 11, 1995

[51] Int. Cl.⁶ ................................................ G21C 13/00
[52] U.S. Cl. .......................... 376/294; 376/285; 376/296; 220/586
[58] Field of Search ..................................... 376/285, 294, 376/295, 296, 461; 220/4.01, 415, 469, 584, 586, 592; 52/223.2

[56] References Cited

U.S. PATENT DOCUMENTS

| | | | |
|---|---|---|---|
| 3,433,382 | 3/1969 | Boggio | 220/592 |
| 3,445,971 | 5/1969 | Desmarchais et al. | 376/294 |
| 3,512,675 | 5/1970 | Pennell | 220/586 |
| 3,606,715 | 9/1971 | Wyss et al. | 220/581 |
| 3,653,434 | 4/1972 | Anderson | 376/294 |
| 3,775,251 | 11/1973 | Schabert | 376/294 |
| 4,032,397 | 6/1977 | Beine et al. | 376/293 |
| 4,192,718 | 3/1980 | Janakiev | 376/294 |
| 4,650,642 | 3/1987 | Gluekler et al. | 376/293 |
| 4,859,402 | 8/1989 | Tupper et al. | 376/285 |
| 5,047,201 | 9/1991 | Schmidt et al. | 376/204 |
| 5,204,054 | 4/1993 | Townsend et al. | 376/296 |
| 5,217,681 | 6/1993 | Wedellsborg et al. | 376/294 |
| 5,229,067 | 7/1993 | Hammers | 376/294 |
| 5,465,280 | 11/1995 | Wedellsborg | 376/294 |

OTHER PUBLICATIONS

Recent Investigations and Tests with the BBR Winding System for Circumferential Prestressing of Concrete Vessels and Containments authored by K. Schutt and F. E. Speck, published 1993, SMiRT–12/K. Kusmaul, Elsevier Science Publishers B.V.

Prestressed Safety Enclosure (PSE) with Metallic Cushion for New or Existing Reactor Pressure Vessels authored by B. W. Wedellsborg, published Aug. 1991, in SMiRT 11 Transactions vol. SD2.

*Primary Examiner*—Daniel D. Wasil
*Attorney, Agent, or Firm*—Thomas R. Lampe

[57] ABSTRACT

A pressure vessel apparatus for containing fluid under high pressure and temperature including pressure surges caused by in-vessel explosions includes a vessel main body, a vessel top body and a vessel head. Elongated tendons interconnect the vessel main body to the vessel top body and elongated tendons with removable anchors also connect the vessel head to the vessel top body. The tendons with insulated protecting sleeves connecting the vessel main body to the vessel top body are chosen to allow the vessel top body to temporarily separate from the vessel main body before the vessel head separates from the vessel top body. These tendons may be mounted directly, on springs, or on dampers in order to provide optimum (minimum) response to the postulated load cases. Reinforced and internally supported bellows are provided about a joint between the vessel main body and the vessel top body to prevent leakage from the interior of the pressure vessel apparatus upon liftoff of the vessel top body from the vessel main body. Continuously wound prestressed wire strands or bands are provided around the periphery of the vessel walls.

14 Claims, 8 Drawing Sheets

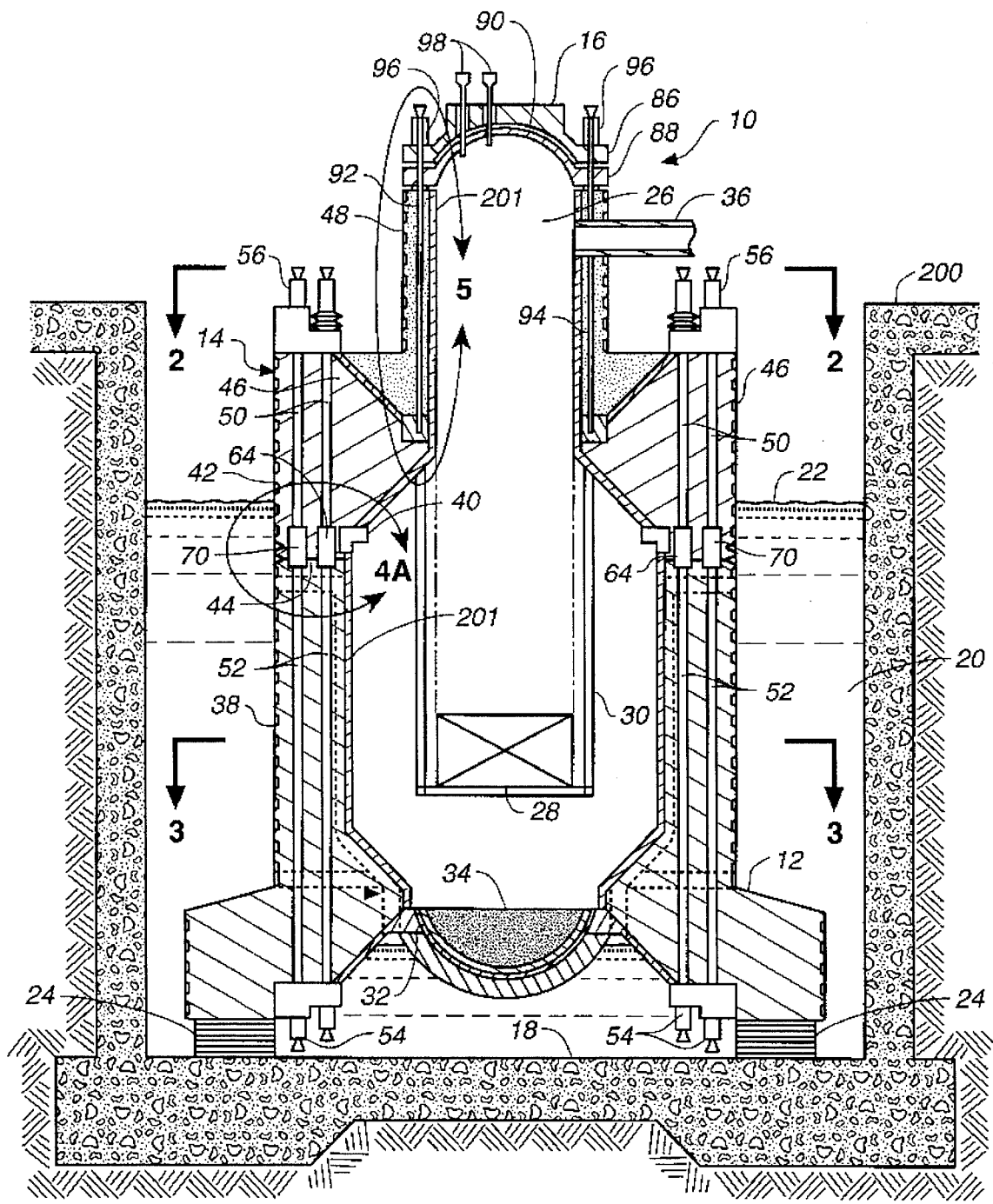
FIG._1

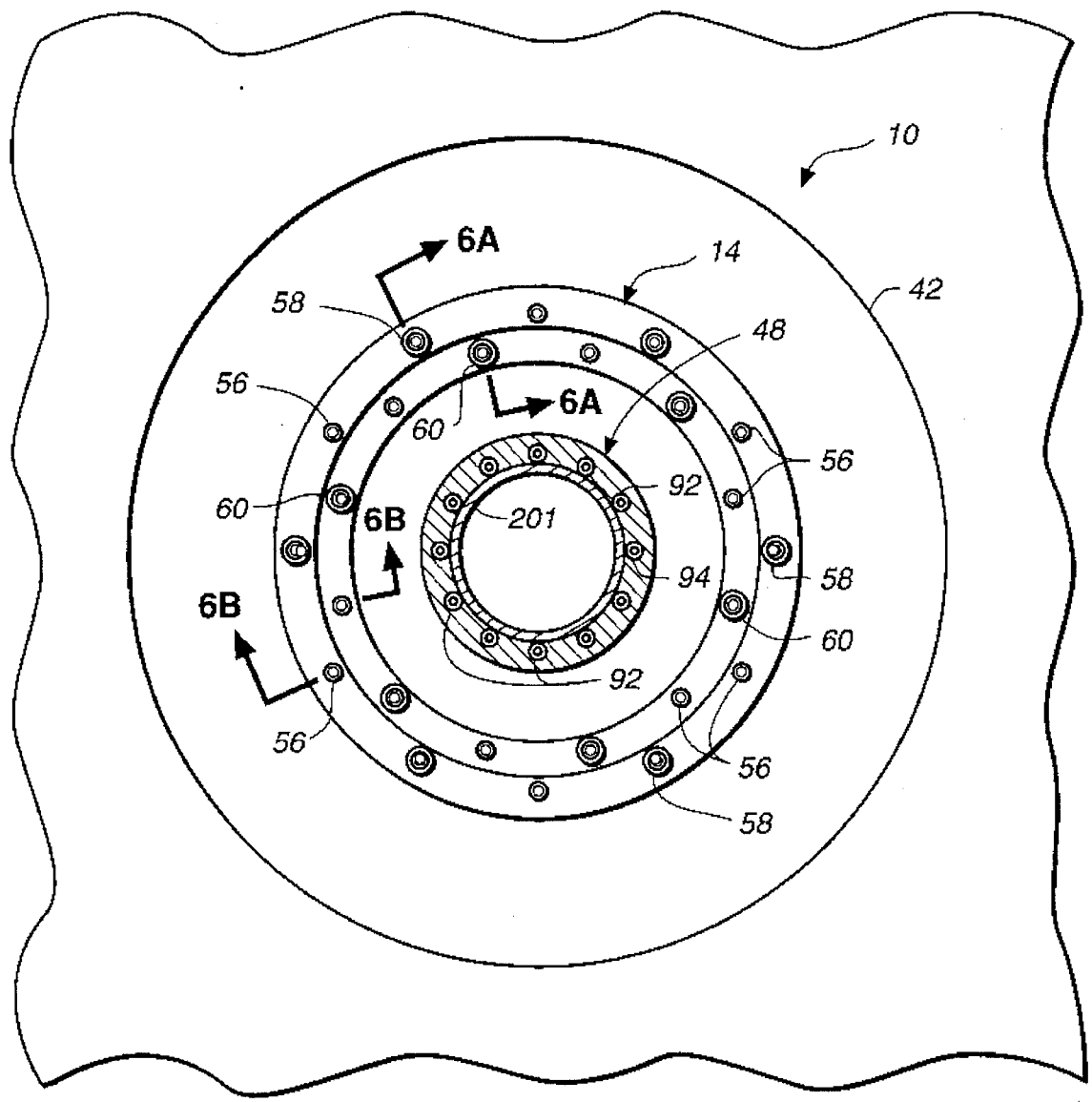
FIG._2

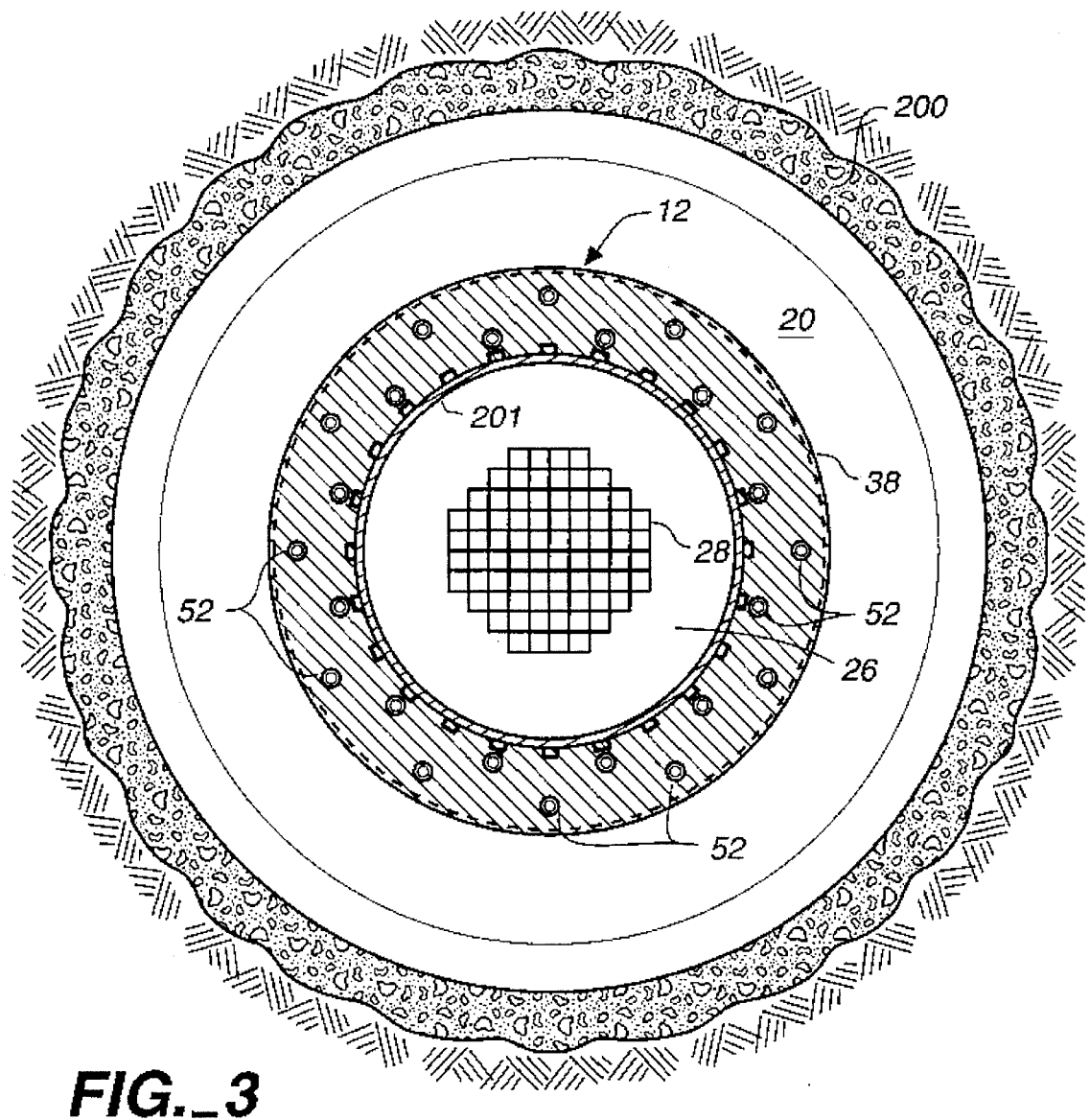
FIG._3

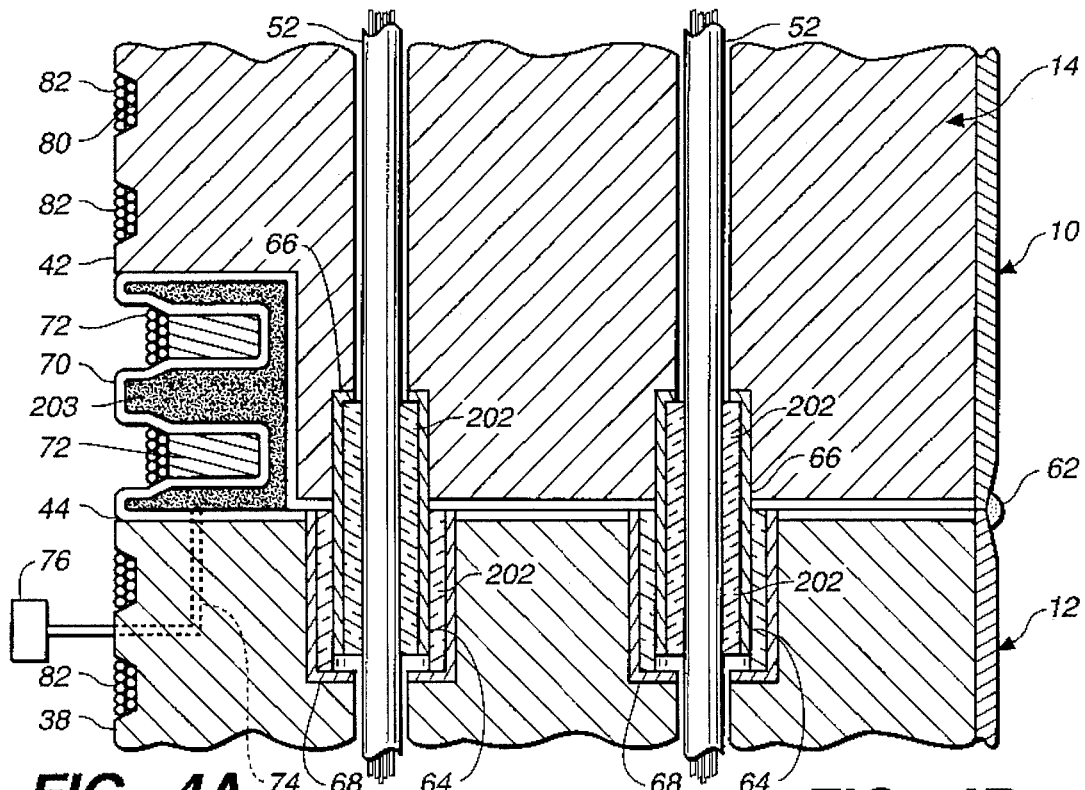
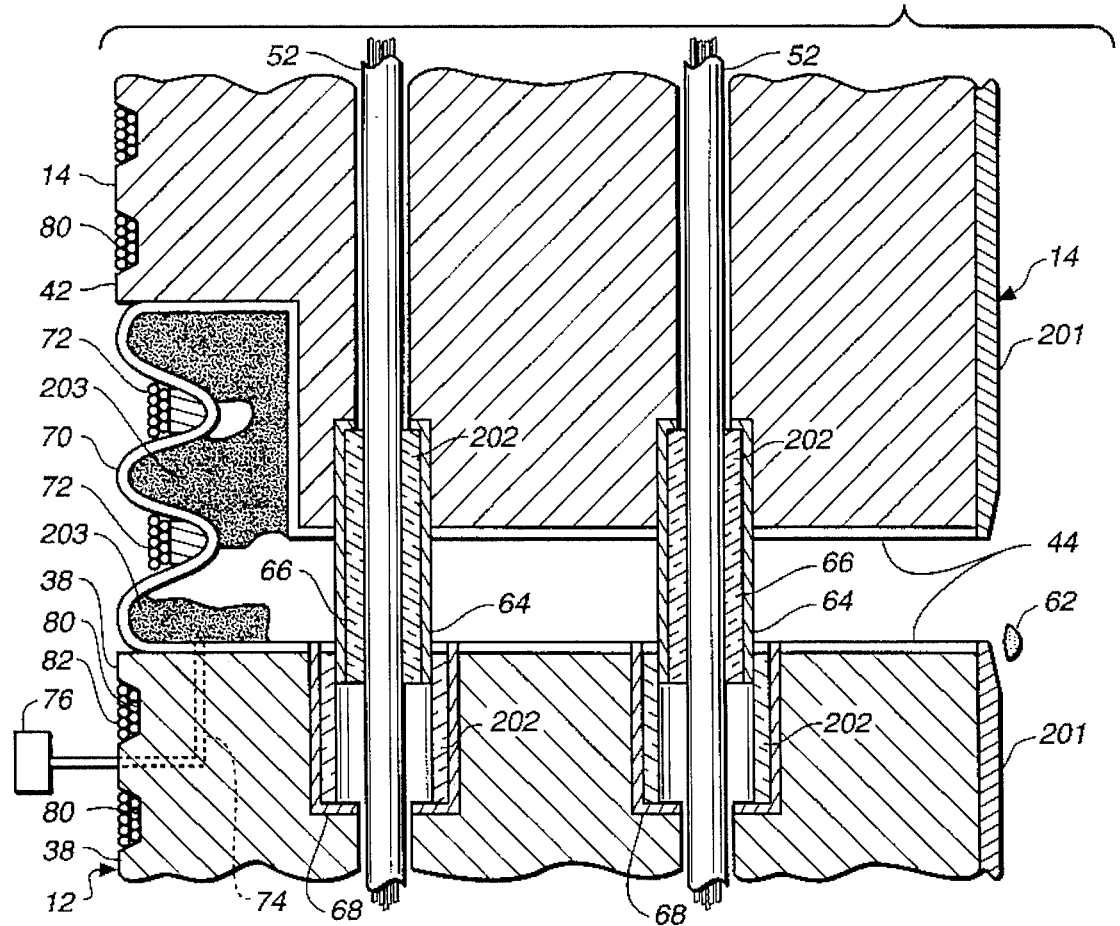
FIG._4A   FIG._4B

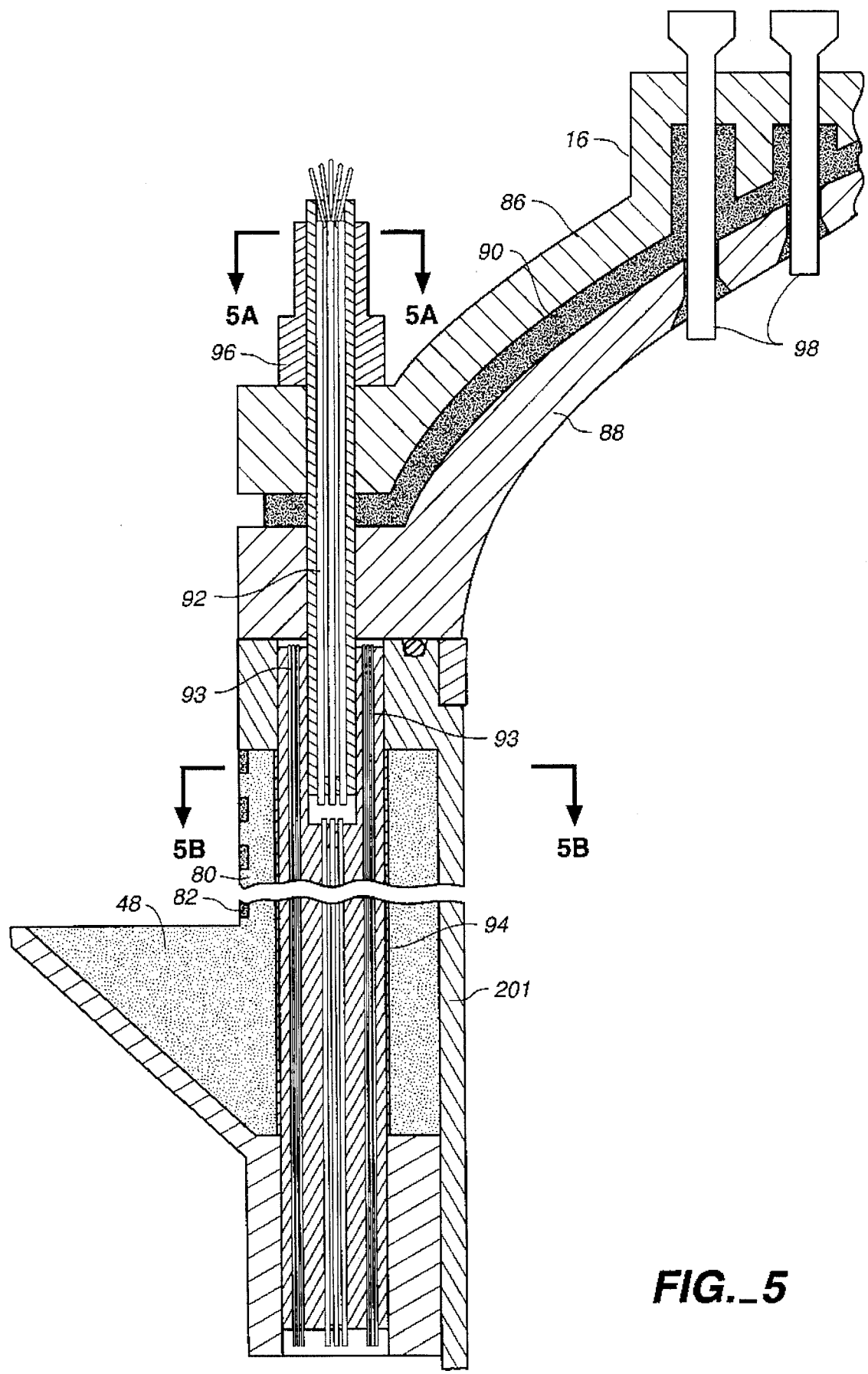
FIG._5

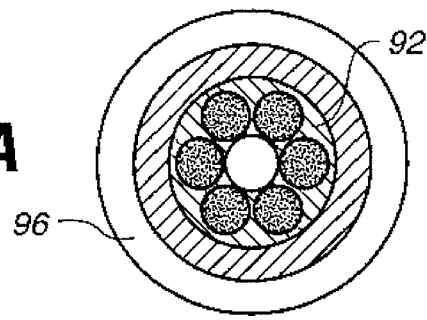
FIG._5A
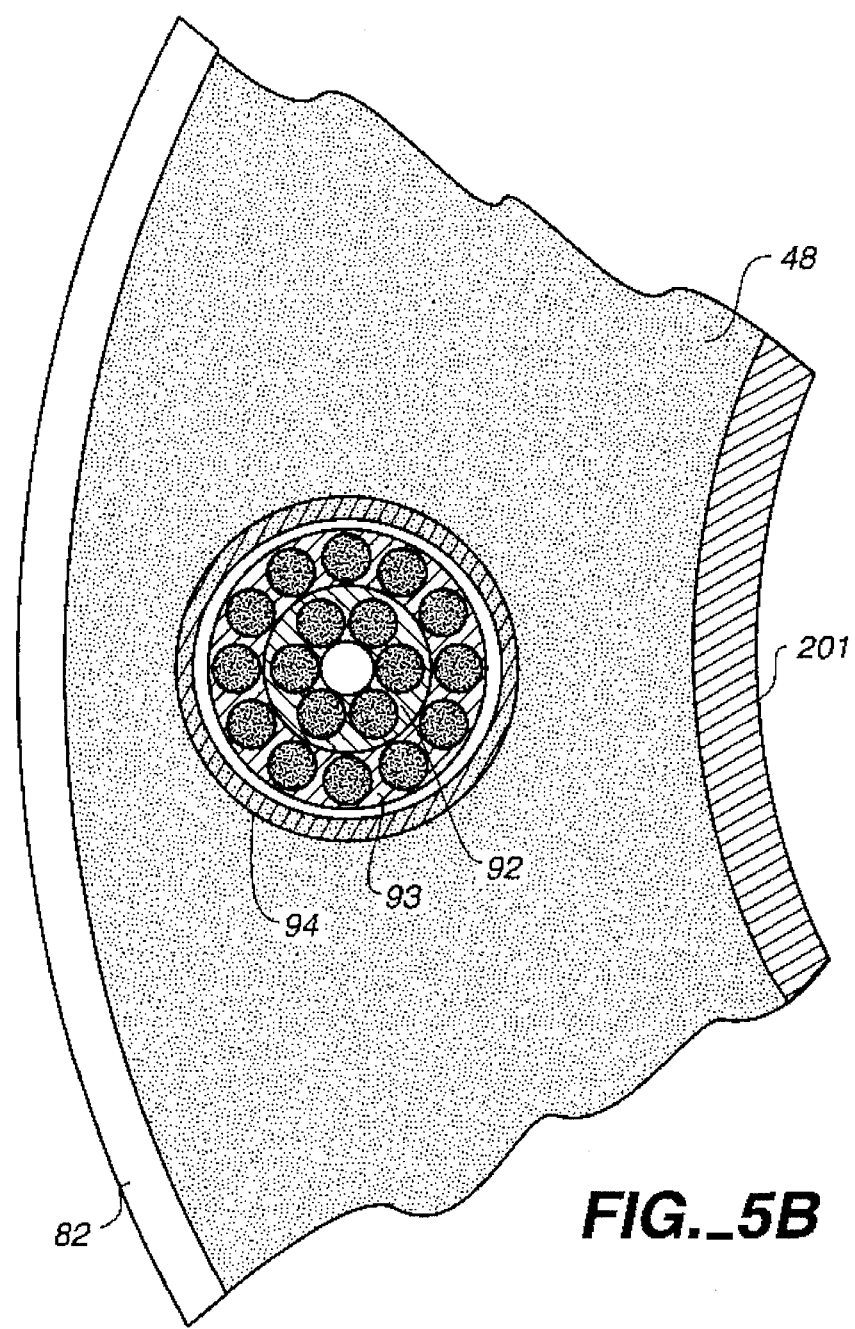
FIG._5B

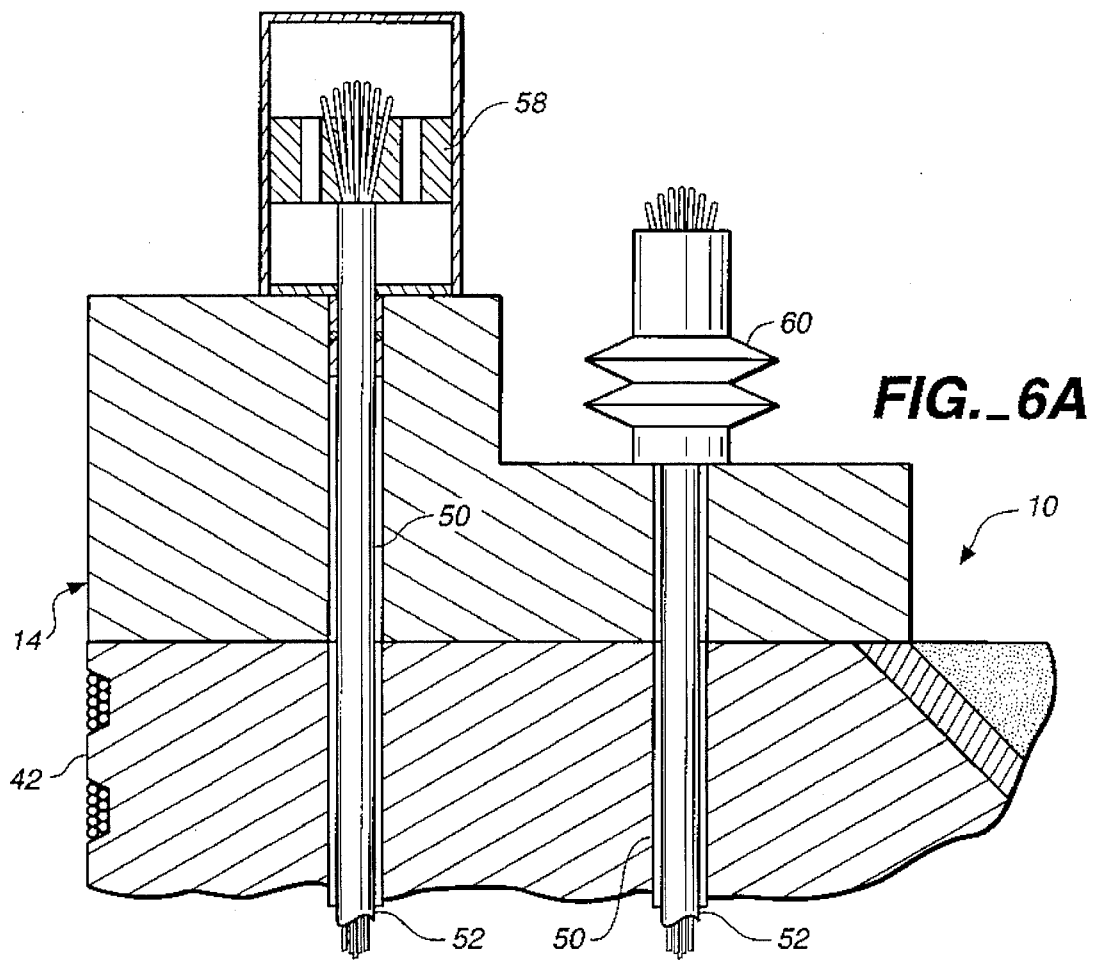
FIG._6A
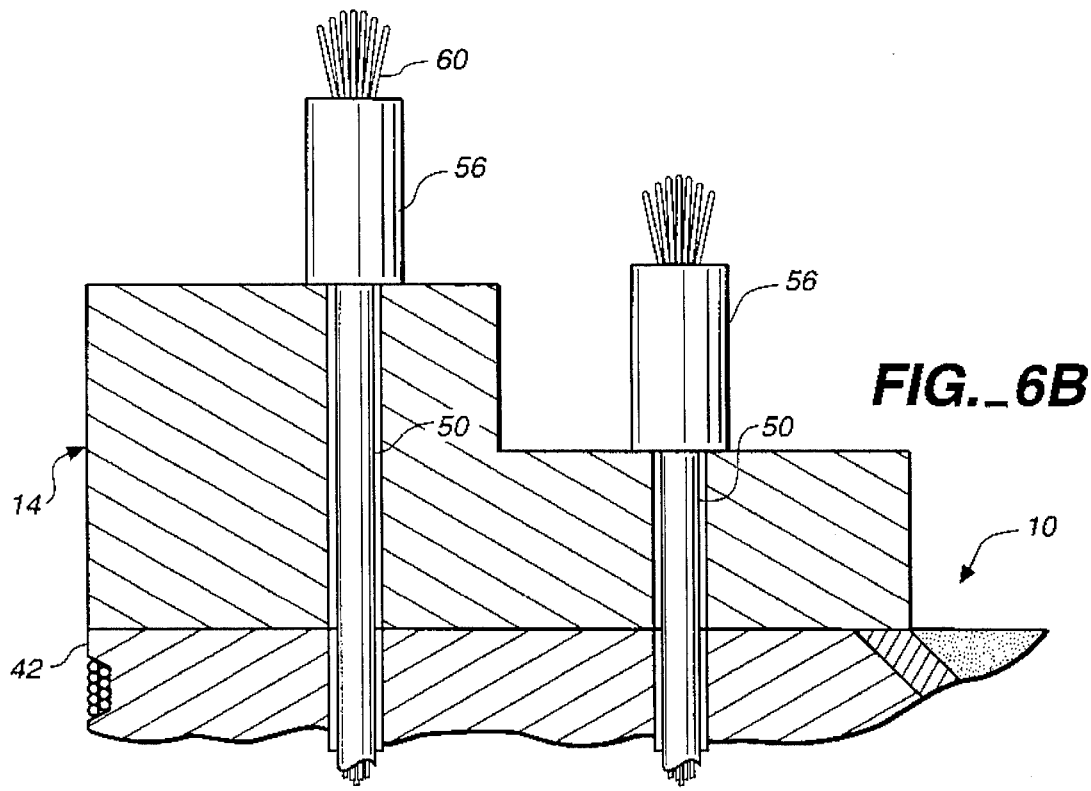
FIG._6B

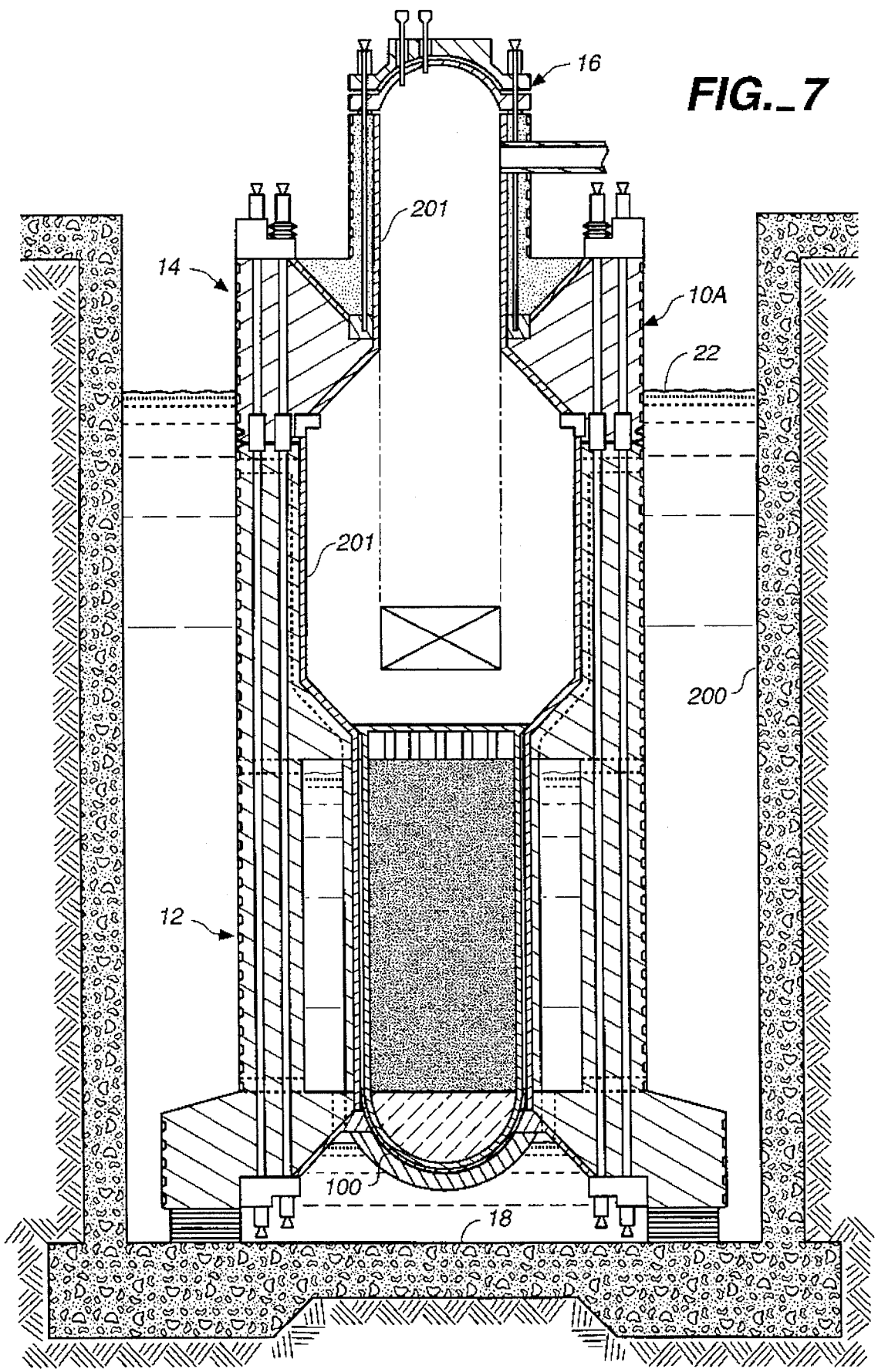
FIG._7

5,544,210

PRESSURE VESSEL APPARATUS FOR CONTAINING FLUID UNDER HIGH TEMPERATURE AND PRESSURE

TECHNICAL FIELD

This invention relates to a pressure vessel apparatus for containing fluid under high temperature and pressure. The apparatus disclosed herein has particular application for use as a nuclear reactor vessel and incorporates safety features.

BACKGROUND ART

My U.S. Pat. No. 5,217,681, issued Jun. 8, 1993, discloses a prestressed pressure vessel safety enclosure used as a pressure safety enclosure for a nuclear reactor pressure vessel or other primary system vessel containing fluid or gaseous material under high pressure. The special pressure vessel enclosure comprises a first pressure vessel containment assembly surrounding the primary pressure vessel. A pair of first upper and lower pressure vessel jackets are adapted to enclose and be spaced apart, respectively, from the upper and lower portions of the first pressure vessel containment assembly with the rims of the jackets adapted to be slidable and sealed with respect to the first pressure vessel containment assembly. The spaces between the jackets and pressure vessel containment assembly are filled with a high boiling point, low melting point metal.

Upper and lower ring girders, connected to each other by tension tendon members, in conjunction with upper and lower jacket bearing plates and skirts are used to apply force to the respective upper and lower jackets for moving the jackets toward or away from each other.

My U.S. Pat. No. 5,465,280, issued Nov. 7, 1995, discloses a nuclear reactor vessel employing bellows in the construction thereof which operate as fluid barriers, confine lead material filler, and allow for relative movement of structural components of the apparatus in a controlled manner. Additionally, the apparatus disclosed in U.S. Pat. No. 5,465,280 incorporates connector tendons of a specialized construction, incorporating two sets of tendons, one of which is prestressed almost to yield point, and the other of which is prestressed to a lesser degree.

U.S. Pat. No. 5,204,054, issued Apr. 20, 1993, discloses a nuclear reactor system pressure vessel comprising a steel inner liner part, an intermediate insulative layer part and an outer concrete encasing part pre-stressed by cable tendons located inside the casing. Use of the pre-stressed construction allows for construction of pressure vessels of larger size. The outer vessel part can be of a cast single piece structure or it can be an integrated concrete segment assembled structure embodying pre-stressing cable tendons arranged in various orientations to effect pre-stressing. Further, the major portion of the pressure vessel can be disposed below grade to lessen the presence of vessel structure in a nuclear system containment. Cooling passages are provided in the pressure vessel to carry off reactor decay heat as well as heat in the concrete outer vessel part.

Applicant is aware of a publication entitled *Recent Investigations and Tests With the BBR Winding System for Circumferential Prestressing of Concrete Vessels and Containments* authored by K. Schütt and F. E. Speck, published in 1993 by Elsevier Science Publishers B. V. in SMiRT-12 Transactions. The publication discloses the use of elongated reinforcement elements in the form of continuously wound prestressing wire strands or bands which are wound about the periphery of large prestressed concrete pressure vessels for nuclear power stations. The prestressed strands are applied in layers spirally wound over the whole width of channels formed at the outer periphery of the concrete pressure vessel, requiring much less space and making them easier to install and inspect compared to cable tendons.

The following publications and United States patents are also believed to be representative of the state of the prior art: U.S. Pat. No. 3,433,382, issued Mar. 18, 1969, U.S. Pat. No. 3,775,251, issued Nov. 27, 1973, U.S. Pat. No. 4,192,718, issued Mar. 11, 1980, U.S. Pat. No. 3,445,971, issued May 27, 1969, U.S. Pat. No. 3,512,675, issued May 19, 1970, U.S. Pat. No. 3,653,434, issued Apr. 4, 1972, U.S. Pat. No. 3,606,715, issued Sep. 21, 1971, U.S. Pat. No. 5,229,067, issued Jul. 20, 1993, U.S. Pat. No. 5,047,201, issued Sep. 10, 1991, U.S. Pat. No. 4,859,402, issued Aug. 22, 1989, U.S. Pat. No. 4,650,642, issued Mar. 17, 1987, and U.S. Pat. No. 4,032,397, issued Jun. 28, 1977.

Applicant has authored a paper entitled *Prestressed Safety Enclosure (PSE) with Metallic Cushion for New or Existing Reactor Pressure Vessels*, published in SmiRT 11 Transactions Vol. SD2 (August, 1991).

DISCLOSURE OF INVENTION

The present invention relates to pressure vessel apparatus defining a pressure vessel interior for containing fluid under pressure. The invention has particular application to nuclear reactor system pressure vessels, especially large size vessels.

Existing pressure vessel designs have two major limitations which tend to restrict the overall safety and capacity of the vessel:

1. Diameter and pressure capacity of the vessel head is limited by the number, size and capacity of the studs tying the head to the vessel body. This limitation in turn limits the number and spacing of the various penetrations which can be located there.

2. Diameter and pressure capacity of the vessel main body and top and bottom is limited by the maximum vessel shell thickness as dictated by manufacturing or fabrication technologies. For nuclear reactor vessels this limitation imposes upper limits on core size and aspect ratio and makes any system integrated design difficult, restricting the space available for steam separation or heat exchangers, spent fuel storage, and a large water reservoir.

The invention described below overcomes these limitations.

The pressure vessel of the present invention incorporates a number of features contributing to the structural stability and safety of such pressure vessels. In particular, such features contribute to the containment of radioactive or toxic materials within the pressure vessel in the event of generation of high pressures therein, for example due to a core melt event, steam explosions, and/or hydrogen explosions. The vessel is always (except during extreme accident) in a state of three dimensional compression. Relative movement between certain structural components thereof due to temporary high pressure conditions within the vessel interior is permitted to avoid structural failure and emission of dangerous materials from the pressure vessel.

The pressure vessel apparatus of the present invention includes a vessel main body having a bottom and an outer peripheral wall extending upwardly from the bottom and defining a vessel main body top opening.

A vessel top body having an outer peripheral wall is positioned on the top opening of the outer peripheral wall of the vessel main body to form a joint therebetween. The vessel top body defines a vessel top body bottom opening communicating with the vessel main body top opening, and the vessel top body defines a top opening.

A vessel head is positioned on the vessel top body and covers the top opening.

First securement means secures the vessel top body to the vessel main body.

Second securement means secures the vessel head to the vessel top body. The second securement means comprises a plurality of double-ended, elongated tendons under tension extending between and secured to the vessel top body and the vessel head.

The outer peripheral walls of the vessel main body and the vessel top body define a plurality of spaced throughbores extending vertically alongside and spaced from the pressure vessel interior. The first securement means includes a plurality of double-ended tendons under tension extending through the throughbores and secured to the vessel main body and the vessel top body.

The tendons secured to the vessel main body and the vessel top body permit movement of the vessel top body away from the vessel main body due to a pressure surge or explosion caused by core melt or other accident within the pressure vessel interior before the tendons secured to the vessel top body and the vessel head permit movement of the vessel head away from the vessel top body due to the pressure surge within the pressure vessel interior.

Other features, advantages, and objects of the present invention will become apparent with reference to the following description and accompanying drawings.

BRIEF DESCRIPTION OF DRAWINGS

FIG. 1 is an elevational, cross-sectional view of apparatus constructed in accordance with the teachings of the present invention;

FIG. 2 is an enlarged cross-sectional view taken along the line 2—2 in FIG. 1;

FIG. 3 is an enlarged cross-sectional view taken along the line 3—3 in FIG. 1;

FIG. 4A is a greatly enlarged cross-sectional view illustrating the portion of the apparatus delineated by double headed arrow 4A with the illustrated structural components in the relative positions normally assumed thereby;

FIG. 4B is a view similar to FIG. 4A but illustrating the structural components in the relative positions assumed thereby when the vessel top body has moved upwardly from the vessel main body due to an increase in pressure within the pressure vessel apparatus;

FIG. 5 is a greatly enlarged cross-sectional view of that portion of the apparatus delineated by double headed arrow 5 in FIG. 1;

FIG. 5A is an enlarged cross-sectional view taken along the line 5A—5A in FIG. 5;

FIG. 5B is a greatly enlarged cross-sectional view taken along line 5B—5B in FIG. 5;

FIG. 6A is a greatly enlarged cross-sectional view taken along line 6A—6A in FIG. 2 illustrating elongated tendons employed in the apparatus connected to damper means and spring means;

FIG. 6B is a greatly enlarged cross-sectional view taken along the line 6B—6B in FIG. 2 and illustrating tendons directly secured to the apparatus vessel top body; and FIG. 7 is a view similar to FIG. 1 illustrating an alternative embodiment of the invention incorporating a core catcher.

MODES FOR CARRYING OUT THE INVENTION

Referring now to FIGS. 1 through 6B, pressure vessel apparatus constructed in accordance with the teachings of the present invention is designated by reference numeral 10. Apparatus 10 is a nuclear reactor pressure vessel for use in large size light water integrated reactor systems and it includes vessel main body 12, vessel top body 14, and vessel head 16. Apparatus 10 is positioned within the interior of a containment vessel 200 with base 18 extending below ground level and defining a sump 20 having cooling water 22 disposed therein.

Vessel main body 12 rests on seismic base isolators 24 located between the vessel base and the vessel main body.

Pressure vessel apparatus 10 defines a pressure vessel interior 26 within which is positioned a nuclear core 28. Suitable support structure 30 such as a core barrel supports nuclear core 28 above the joint 44 of the vessel main body. In the arrangement illustrated, the vessel bottom 32 is convex and contains lead, lead alloy or other material 34. As is conventional, a steam outlet line 36 is in communication with the pressure vessel interior. A water inlet line (not shown) is also employed to furnish feed water to the pressure vessel interior.

The vessel main body is constructed of any suitable material such as cast iron or reinforced concrete and includes an outer peripheral wall 38 with internal lining 201 of stainless steel plate extending upwardly from the bottom 32. At the top thereof the outer peripheral wall 38 defines a vessel main body top opening 40.

Vessel top body 14 has an outer peripheral wall 42 positioned on the outer peripheral wall 38 of the vessel main body, forming a joint 44 therebetween. Outer peripheral wall 42 defines a vessel top body bottom opening corresponding in size to and communicating with the vessel main body top opening 40.

In the arrangement illustrated, vessel top body 14 is of multi-part construction, including a segment 46 having an outer periphery corresponding to that of the vessel main body and a segment 48 which is of reduced circumference. The lower end of segment 48 is of frusto-conical configuration and seats into a recess of like size and configuration at the top of segment 46.

Any suitable material such as cast iron or reinforced concrete may be utilized in the construction of vessel top body 14. As illustrated, segment 48 may be formed of reinforced concrete and segment 46 may be formed from cast iron, with internal lining 201 of stainless steel.

The outer peripheral walls of vessel main body 12 and vessel top body 14 define a plurality of spaced throughbores 50 extending from the top of vessel top body 14 through the bottom of vessel main body 12. Throughbores 50 extend vertically alongside and spaced from the pressure vessel interior.

A plurality of double-ended tendons under tension extend through the throughbores 50 and are secured to the vessel main body and the vessel top body. The tendons, which are designated by reference numeral 52, are directly connected at the bottoms thereof to vessel main body 12 by fixed tendon anchors 54.

At the upper ends thereof tendons 52 are connected to vessel top body 14 in three different ways. Some of the tendons 52 are directly connected to the vessel top body 14 by tendon anchors 56 (see FIG. 6B). Suitable means such as an internal thread connection (not shown) is preferably employed to adjust the degree of tension imparted to the tendons 52 operatively associated with tendon anchors 56. These tendons may be provided with couplings (not shown) located beneath the joint 44.

With reference to FIG. 6A, some of the tendons 52 may be prestressed close to yield and have their upper ends connected to a dashpot or damper 58 while other of the tendons are slightly prestressed and attached to disc spring mounts 60. The amount of prestress, the number, spacing and proportion of tendons mounted directly, on disc springs, or on dampers is based on a precalculation readily performed by a person skilled in the art to result in the optimum desired response of the vessel top body to given or postulated loads applied thereto. The purpose of the tendons 52 is to carry the vessel pressure during normal service and also to absorb pressure surges which may occur within the pressure vessel interior, for example caused by explosions or the like. Most of the energy will be absorbed by tendons 52 which may stretch into the plastic range up to a certain per cent of their length, e.g. about 3 per cent but less than ultimate. The different mounts of the tendons 52 will limit the response to less than ultimate.

Since the tendons 52 essentially provide the sole force (other than gravity) maintaining the vessel top body in place on the vessel main body, stretching or elongation of the tendons 52 will enable the vessel top body 14 to be momentarily displaced in an upward direction relative to the vessel main body 12 to absorb the energy of sufficient increased pressure. In most instances such pressure increases can be expected to be of very brief duration, resulting in the vessel top body 14 again moving downwardly into place on the vessel main body 12.

FIG. 4A shows the vessel top body 14 in its normal position relative to vessel main body 12 at joint 44. Upon increase of vessel interior pressure to a sufficient value, the vessel top body 14 will move upwardly as shown in FIG. 4B. Also illustrated in FIG. 4B is a sacrificial weld 62 which has less capacity than the liner 201 and fractures to allow separation of the vessel top body from the vessel main body upon application of sufficient force.

As may also be seen with reference to FIGS. 4A and 4B, protective sleeves 64 with thermal insulation 202, for example asbestos, are disposed about tendons 52 at the location of joint 44 to afford protection to the tendons during relative movement between the vessel top body and the vessel main body, for example, by isolating the tendons from contact by hot fluids escaping the pressure vessel interior. The sleeves may also serve as guide for the vessel top body during the separation from the main body. In the arrangement illustrated, the sleeves 64 incorporate two components 66 and 68 which telescope relative to one another, sleeve component 66 being attached to vessel top body 14 while the sleeve components 68 are connected to vessel main body 12 and allow relative movement with respect to the tendons.

At joint 44, bellows 70, cut and welded from steel tubing or formed of bent steel sheet or the like, extend between the vessel main body and the vessel top body about the joint to form a seal about the joint. Thus, bellows 70 serves to prevent the escape of heated fluids from the apparatus even when pressure surges results in dislocation of the vessel top body upwardly from the vessel main body. Elongated reinforcement members in the form of wires, bands or cables 72 limit the degree of outward movement of the bellows as shown in FIG. 4B. A cushion 203 of metallic lead, or other suitable material, is provided inside the bellows for support during the prestressing of the bellow reinforcement members 72. A passageway 74 leading from the space between the bellows 70 and the vessel top body 14 is in communication with instrumentation 76 to monitor liner leak tightness pressure or other physical conditions.

Channels 80 extend circumferentially about vessel main body 12 and vessel top body 14. Channels 80 accommodate elongated reinforcement elements in the form of continuously wound prestressing wire strands or bands 82 under tension in engagement with and extending about the outer peripheral walls 38, 42 and 48. These prestressed reinforcement elements 82 substantially contribute to the structural strength of the vessel main body and the vessel top body and contribute to the ability thereof to resist high pressure generated within the pressure vessel interior. Any "breathing" of the structure may occur if the main body is segmented only after the top body separates from the main body, and will be short lived or not occur at all because of the formidable reserve strength of the prestressed reinforcement elements 82.

Vessel head 16 includes two dome-like steel shells 86, 88 having outwardly extending peripheral flanges. In the arrangement shown, a lead, aluminum, or other metallic filler 90 is disposed between shells 86, 88 to distribute forces. Double-ended, elongated tendons 92 extend through spaced openings formed in the head flange comprised of the flanges of shells 86, 88 and extend downwardly to tendon coupling 93 located in throughbores 94 in the vessel top body 14 which are in registry with the openings in the head flanges.

The lower ends of tendon couplings 93 are fixedly secured to the vessel top body 14 in any desired manner. The top ends of the tendons 92 are connected to the head shell 86 by head tendon stud anchors 96 which are preferably adjustable to control the degree of tension imparted to tendons 92.

An important feature of the present invention resides in the fact that the tendons 52 secured to the vessel main body and the vessel top body permit movement of the vessel top body away from the vessel main body due to a pressure surge within the pressure vessel interior before the tendons secured to the vessel top body and the vessel top head permit movement of the vessel top head away from the vessel top body due to a pressure surge within the pressure vessel interior.

As is conventional, the vessel head 16 supports control rod stand pipes 98, drive mechanism, shafts and housings, and various instrumentation which pass through openings in the vessel head (not shown) and extend to the nuclear core 28. FIG. 3 depicts a cross-section of the symmetric core with fuel-bundles within the pressure vessel interior 26. In the interest of simplicity, FIG. 1 only shows the upper portions of two control rod stand pipes 98.

Momentary lifting of the vessel top body 14 (and thus vessel head 16) from vessel main body 12 as a result of high pressures within the pressure vessel interior will not cause relative movement between the control rods and the nuclear core because the support structure 30 supporting the nuclear core is itself supported by the vessel top body and will move upwardly therewith. The use of wire strand tendons to hold the vessel head to the vessel top body is a considerable improvement over the conventional threaded studs which have a lower strength capacity and ductility than the tendon studs which are normally at least partially comprised of wire strands. This permits a larger diameter and pressure load on the vessel head, and reduces stress and allows more room for control rods or other penetrations.

With the present arrangement, all tension anywhere in the apparatus is carried or assumed by high-tensile wires or bands. The vessel main body, the vessel top body and most of the vessel head are under compression, with the apparatus itself in a state of three dimensional compression.

FIG. 7 discloses an alternative form of the apparatus, identified by reference numeral 10A which is essentially of the same construction as apparatus 10 except that it employs a core catcher 100 containing lead or lead alloy for receiving core material and dissipating the decay heat in case of an accident.

What is claimed is:

1. Pressure vessel apparatus defining a pressure vessel interior for containing fluid under high temperature and pressure, said pressure vessel apparatus comprising, in combination:

a vessel main body having a bottom and an outer peripheral wall extending upwardly from said bottom and defining a vessel main body top opening;

a vessel top body having an outer peripheral wall positioned on the outer peripheral wall of said vessel main body to form a joint therebetween and defining a vessel top body bottom opening communicating with said vessel main body top opening, and said vessel top body defining a top opening;

a vessel head positioned on said vessel top body and covering said top opening;

first securement means securing said vessel top body to said vessel main body; and second securement means securing said vessel head to said vessel top body, said second securement means comprising a plurality of double-ended, elongated tendons under tension extending between and secured to said vessel top body and said vessel head.

2. The pressure vessel apparatus according to claim 1 wherein the outer peripheral walls of said vessel main body and said vessel top body define a plurality of spaced throughbores extending vertically alongside and spaced from said pressure vessel interior, said first securement means including a plurality of double-ended tendons under tension extending through said throughbores and secured to said vessel main body and said vessel top body.

3. The pressure vessel according to claim 2 wherein the tendons secured to said vessel main body and said vessel top body permit movement of said vessel top body away from said vessel main body due to a pressure surge within said pressure vessel interior before the tendons secured to said vessel top body and said vessel head permit movement of said vessel head away from said vessel top body due to a pressure surge within said pressure vessel interior.

4. The pressure vessel according to claim 2 additionally comprising damper means connected to at least some of the tendons extending through said throughbores and secured to said vessel main body and said vessel top body.

5. The pressure vessel according to claim 2 additionally comprising spring means connected to at least some of the tendons extending through said throughbores and secured to said vessel main body and said vessel top body.

6. The pressure vessel according to claim 2 additionally comprising protective sleeves surrounding said throughbores at the joint between said vessel main body and said vessel top body protecting and guiding the tendons extending through said throughbores.

7. The pressure vessel apparatus according to claim 2 additionally comprising bellows secured to said vessel main body and said vessel top body about said joint to form a seal about said joint.

8. The pressure vessel apparatus according to claim 7 additionally comprising elongated reinforcement members extending about said bellows and cooperable therewith to limit outward movement of said bellows.

9. The pressure vessel apparatus according to claim 1 additionally comprising elongated reinforcement elements under tension in engagement with and extending about the outer peripheral walls of said vessel main body and said vessel top body.

10. The pressure vessel apparatus according to claim 7 additionally comprising support means in the form of metallic cushions disposed inside the bellows for supporting the bellows during prestressing of the elongated reinforcement members.

11. The pressure vessel apparatus according to claim 1 comprising a nuclear reactor vessel, said pressure vessel interior accommodating a nuclear reactor core.

12. The pressure vessel apparatus according to claim 1 wherein said vessel top body has a steel lining welded to a steel lining inside said vessel main body at said joint, to form a weld which will fracture when pressure within said pressure vessel interior is increased beyond the yield capacity of said tendons secured to said main vessel body.

13. The pressure vessel according to claim 2 additionally comprising damper means connected to some of the tendons extending through said throughbores and secured to said vessel main body and said vessel top body and spring means connected to some of the tendons extending through said throughbores and secured to said vessel main body and said vessel top body, some of the tendons extending through said throughbores and secured to said vessel main body and said vessel top body being secured directly to said vessel main body and said vessel top body.

14. The pressure vessel according to claim 11 additionally comprising support means supporting said nuclear reactor core from said vessel top body.

* * * * *